July 24, 1934. E. E. MILNER Re. 19,253

LEER FEEDER

Original Filed Aug. 10, 1929. 2 Sheets-Sheet 1

INVENTOR.
Edwin E. Milner,
BY
Hood + Hahn
ATTORNEYS

July 24, 1934. E. E. MILNER Re. 19,253

LEER FEEDER

Original Filed Aug. 10, 1929 2 Sheets-Sheet 2

INVENTOR.
Edwin E. Milner,
BY
Hood & Hahn.
ATTORNEYS

Reissued July 24, 1934

Re. 19,253

UNITED STATES PATENT OFFICE 19,253

LEER FEEDER

Edwin E. Milner, Muncie, Ind., assignor to Ball Brothers Company, Muncie, Ind., a corporation of Indiana Original application August 10, 1929, Serial No. 384,948. Patent No. 1,908,528, dated May 9, 1933. Divided and this application October 20, 1930, Serial No. 489,866. Patent No. 1,952,680, dated March 27, 1934. Application for reissue May 12, 1934, Serial No. 725,394

4 Claims. (Cl. 198—31)

The present application relates to transfer mechanism, and more particularly to mechanism, automatic in character, for transferring articles from one conveyor to another. The present application is a division of my patented application No. 1,908,528 for Leer, patented May 9, 1933.

The primary object of the invention is to provide mechanism which shall be wholly automatic in character and which shall operate periodically, in response to movement of one of the conveyors, for moving articles from one of said conveyors to the other, and then returning to its initial position without interfering with further articles which may be advancing upon the first conveyor. Further objects of the invention will appear as the description proceeds.

To the accomplishment of the above and related objects, my invention may be embodied in the form illustrated in the accompanying drawings, it being understood however that said drawings are illustrative only, and that change may be made in the specific details of construction so long as the scope of the appended claims is not violated.

In said drawings.

Referring more particularly to the drawings, it will be seen that I have illustrated a sectional leer forming an enclosed passage 10, the floor of said passage being formed by rollers 29. Preferably, said rollers are constantly driven by suitable mechanism.

The entry to the passage 10 is formed by a hood H, having a portion of its floor provided with rollers 29′ disposed in the plane of the rollers 29 and preferably driven at the speed of the rollers 29. As will be obvious, the rollers 29′ and 29 form a conveyor.

Figure 1:
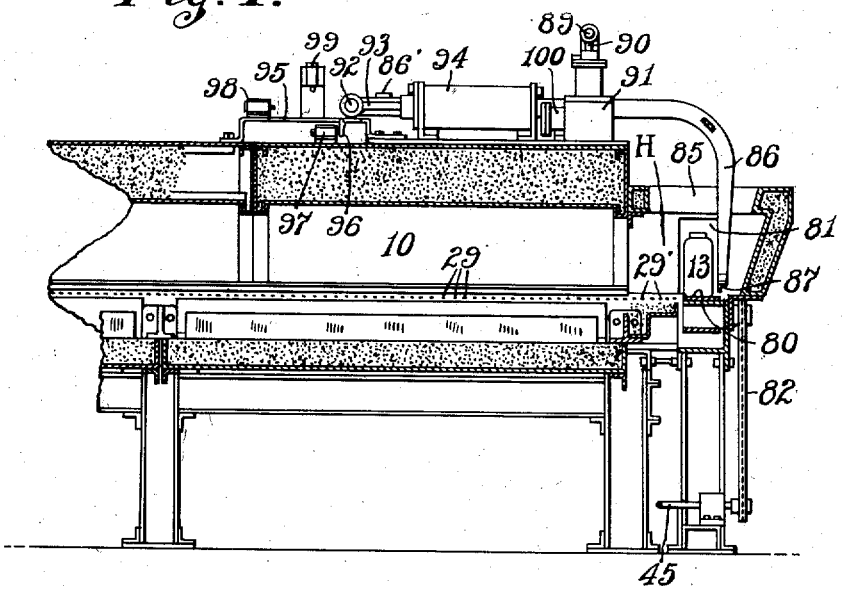
Fig. 1 is a substantially central section through a leer to which transfer mechanism constructed in accordance with my invention has been applied.
Figure 2:
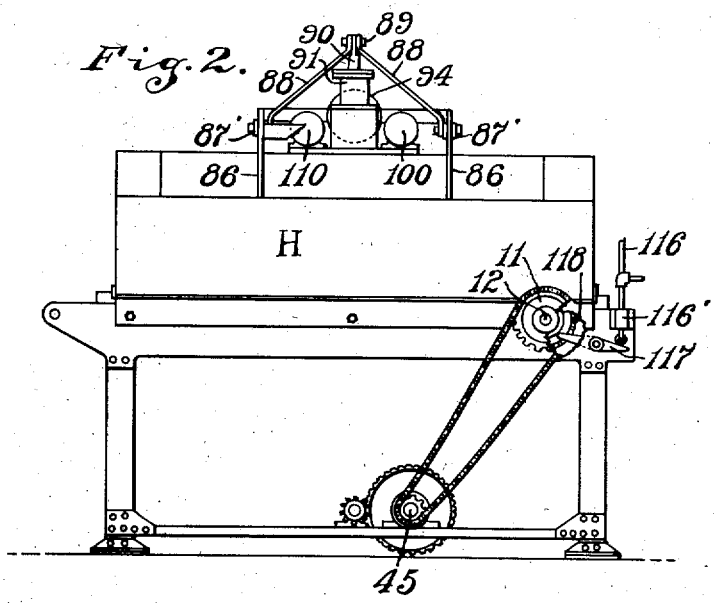
Fig. 2 is an end elevation thereof.

A second conveyor comprising a continuous belt or chain 80 is disposed with its upper run substantially in the plane of the rollers 29 and 29′, and said run moves transversely of the conveyor formed by the rollers. As is clearly shown, the conveyor 80 is driven from a shaft 45, suitably driven from any source of power, a chain 82 being driven by a sprocket on the shaft 45, and cooperating with a sprocket 11 on the shaft 12 provided with one of the pulleys for the conveyor 80. The hood is formed with a door 81 through which the conveyor 80 may carry articles such as the article indicated at 13 in Fig. 1.

The top of hood H is slotted at 85 and through the slots are projected two depending fingers 86, the lower ends of said fingers carrying a pusher bar 87 adapted to move laterally across the top run of conveyor 80. The horizontally extending portions of fingers 86 are supported on rollers 87′ carried by depending arms 88 pivoted at 89 upon the end of the piston rod 90 of an air cylinder 91, and at their forward ends the fingers 86 are pivoted, at 92, to the piston rod 93 of a cylinder 94.

Figure 3:
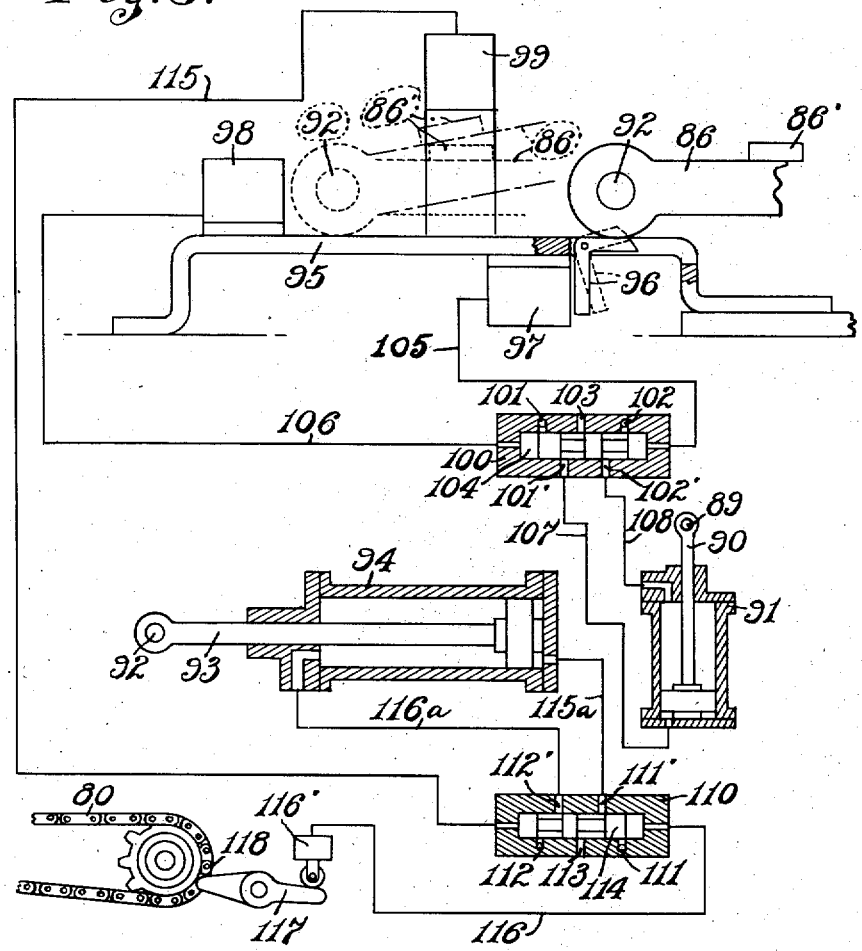
Fig. 3 is a diagrammatic illustration of the operating details of my transfer mechanism.

The forward end of one of the fingers 86 traverses a track 95 (Fig. 3). At the rear end of track 95 is a trigger 96 arranged to be engaged by finger 86 at the rear end of its stroke, and this trigger is arranged to open an air supply valve 97 when depressed by finger 86 as shown in full lines in Fig. 3.

At the forward end of track 95 is an air valve 98 arranged to be opened by finger 86 when at the forward end of its stroke, as indicated in dotted lines in Fig. 3.

At an intermediate point in the length of track 95 is an air valve 99 arranged to be opened by finger 86 at the beginning of its return or rearward stroke.

100 is a pneumatic valve casing having vent ports 101 and 102, to atmosphere; delivering ports 101′ and 102′ for supply of air to the opposite ends of cylinder 91; an inlet port 103 for air supply; and a piston valve 104 for controlling said ports. Air lines 105 and 106 connect the opposite ends of casing 100 with valves 97 and 98. Air lines 107 and 108 connect the opposite ends of cylinder 91 with ports 101′ and 102′.

110 is a pneumatic valve casing having vent ports 111 and 112; air delivery ports 111′ and 112′; air supply port 113; and a piston valve 114 controlling said ports. Air lines 115*a* and 116*a* connect the opposite ends of cylinder 94 with ports 111′ and 112′. An air line 115 connects valve 99 with one end of casing 110 and an air line 116 connects the other end of said casing 110 with a valve 116′ adapted to be opened by lever 117 intermittently actuated by pins 118 carried by, or moving in synchronism with, belt 80. The valves 97, 98, 99 and 116′ are of a form well known in glass house practice, are connected to a supply of compressed air and are spring pressed to air-cut-off position and in that position vent their delivery lines to atmosphere.

The operation is as follows: Belt 80 is continuously driven, receives ware from any suitable supply and carries said ware into the leer in front of the pusher bar 87. Upon a predetermined movement of belt 80 a pin 118 actuates lever 117 which, in turn, actuates valve 116′ to admit air to casing 110 driving valve 114 to the left-hand position shown in Fig. 3 to admit air to the right-hand end of cylinder 94, and to vent the left-hand end thereof. Rod 93 moves to the left in Figs. 1 and 3, bar 87 sweeping the ware onto shafts 29′ and these shafts, and shafts 29 being in rotation, the ware is thereafter advanced through the tunnel of the leer.

As finger 86 moves to the left it passes under valve 99 without actuating it and at the end of its movement in this direction, opens valve 98 to admit fluid under pressure to casing 100 to drive valve 104 to the right-hand position shown in Fig. 3, thus admitting air to the lower end of cylinder 91. This lifts hangers 88 and thus raises the pusher bar 87 above the level of the tops of ware which is arriving on belt 80. When rod 90 reaches the upper end of its stroke a pad 86′ on finger 86 opens valve 99 and thus admits air to the left-hand end of casing 110 to drive valve 114 to the right, thus venting the right-hand end of cylinder 94 and admitting air to its left-hand end, whereupon the pusher bar 87 is carried back over the tops of the arriving ware. When finger 86 arrives at the rear or right-hand end of its stroke it engages trigger 96 to open valve 97 to admit fluid under pressure to casing 100 to drive valve 104 to the left, thus venting the lower end of cylinder 91 and admitting air to the upper end of said cylinder, thereby lowering bar 87 to the starting point.

I claim as my invention:

1. Transfer mechanism comprising a bar, an arm carrying said bar, motor means for reciprocating said arm and bar, motor means for oscillating said arm, and means for activating said motor means comprising an element contacted by said arm at one end of the reciprocatory stroke of said arm and connected to energize said second motor means to cause oscillation of said arm in one direction, an element contacted by said arm at the end of its oscillatory stroke in said direction and connected to energize said first motor to move said arm toward the opposite end of its reciprocatory stroke, and an element actuated by said arm at said last-mentioned end of its reciprocatory stroke and connected to energize said second motor to cause oscillation of said arm in the opposite direction.

2. Transfer mechanism comprising a bar, an arm on which said bar is mounted, a fluid-pressure motor for reciprocating said arm, a second fluid-pressure motor for oscillating said arm about a point remote from said bar, means disposed in the reciprocatory path of said arm and adapted to be contacted thereby, said means being connected to supply, when contacted by said arm, fluid under pressure to said second motor to move the same in one direction, means disposed in the oscillatory path of said arm and adapted to be contacted thereby, said means being connected to supply, when contacted by said arm, fluid under pressure to said first motor to move the same in one direction, and means disposed in the reciprocatory path of said arm and adapted to be contacted thereby, said means being connected to supply, when contacted by said arm, fluid under pressure to said second motor to move the same in the opposite direction.

3. Transfer mechanism comprising a carriage, a bar carried thereon, a fluid-pressure motor for reciprocating said carriage, a fluid-pressure motor for oscillating said carriage about a point remote from said bar, a source of fluid under pressure connected to said motors, a pressure-actuated valve connected between said source and said first motor, a pressure-actuated valve connected between said source and said second motor, each of said valves being independently actuable to direct fluid flow to one end or the other of its motor, a control valve positioned for actuation by said carriage at one end of the stroke of the latter and connected to direct fluid under pressure to said second pressure-actuated valve to move the same to a position to direct a flow of fluid to one end of said second motor, a second control valve positioned for actuation by movement of said carriage under the influence of said second motor so energized, said second control valve being connected to direct fluid under pressure to said first pressure-actuated valve to move the same to a position to direct a flow of fluid to one end of said first motor to move said carriage away from said first control valve, and a third control valve positioned to be actuated by such last-mentioned movement of said carriage, said third control valve being connected to direct fluid under pressure to said second pressure-actuated valve to move the same to a position to direct a flow of fluid to the other end of said second motor.

4. The combination with a first conveyor and a second conveyor, of mechanism for moving articles from said first conveyor to said second conveyor, said mechanism comprising a bar normally separated by said first conveyor from said second conveyor, a carriage supporting said bar, a fluid-pressure motor connected to reciprocate said carriage, a fluid-pressure motor connected to oscillate said carriage about a point remote from said bar, a source of fluid under pressure connected to said motors, a pressure-actuated valve connected between said source and said first motor, a pressure-actuated valve connected between said source and said second motor, each of said valves being independently actuable to direct fluid flow to one end or the other of its motor, a control valve positioned for actuation by an element on said first conveyor, said control valve being connected to direct fluid under pressure to said first pressure-actuated valve to move the same to a position to direct a flow of fluid to one end of said first motor to move said carriage and bar transversely across said first conveyor, a second control valve positioned for actuation by said carriage at the end of such movement, said second control valve being connected to direct fluid under pressure to said second pressure-actuated valve to move the same to a position to direct a flow of fluid to one end of said second motor to oscillate said carriage in one direction about its pivot, a third control valve positioned for actuation by said carriage at the end of said oscillation, said third control valve being connected to direct fluid under pressure to said first pressure-actuated valve to move the same to a position to direct a flow of fluid to one end of said first motor to move said carriage away from said first control valve, and a fourth control valve positioned to be actuated at the end of such last-mentioned movement of said carriage, said fourth control valve being connected to direct fluid under pressure to said second pressure-actuated valve to move the same to a position to direct a flow of fluid to the other end of said second motor to return said bar and carriage to initial position.

EDWIN E. MILNER.